US009524382B2

(12) United States Patent
Zhou et al.

(10) Patent No.: US 9,524,382 B2
(45) Date of Patent: Dec. 20, 2016

(54) SYSTEM AND METHOD FOR CENTRALIZEDLY CONTROLLING SERVER USER RIGHTS

(71) Applicant: TENCENT TECHNOLOGY (SHENZHEN) COMPANY LIMITED, Shenzhen (CN)

(72) Inventors: Tang Zhou, Shenzhen (CN); Ang Li, Shenzhen (CN); Peng Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 165 days.

(21) Appl. No.: 14/585,268

(22) Filed: Dec. 30, 2014

(65) Prior Publication Data

US 2015/0113610 A1 Apr. 23, 2015

Related U.S. Application Data

(63) Continuation of application No. PCT/CN2014/075666, filed on Apr. 18, 2014.

(30) Foreign Application Priority Data

Jun. 7, 2013 (CN) .......................... 2013 1 0226082

(51) Int. Cl.
 *G06F 17/30* (2006.01)
 *G06F 21/30* (2013.01)
 (Continued)

(52) U.S. Cl.
 CPC ............. *G06F 21/30* (2013.01); *G06F 21/604* (2013.01); *H04L 63/00* (2013.01); *H04L 63/10* (2013.01)

(58) Field of Classification Search
 CPC .. H04L 61/1511; H04L 61/1523; H04L 29/06; G06F 3/1238; G06F 3/1239; G06F 17/30867; H04W 4/001
 See application file for complete search history.

(56) References Cited

U.S. PATENT DOCUMENTS

| 6,654,891 | B1 * | 11/2003 | Borsato ................... H04L 29/06 370/242 |
| 2002/0091745 | A1 * | 7/2002 | Ramamurthy .... G06F 17/30867 718/100 |
| 2009/0210541 | A1 * | 8/2009 | Chandolu ........... H04L 61/1523 709/229 |

FOREIGN PATENT DOCUMENTS

| CN | 101083527 A | 12/2007 |
| CN | 101645775 A | 2/2010 |
| CN | 103067463 A | 4/2013 |

OTHER PUBLICATIONS

The World Intellectual Property Organization (WIPO) International Search Report for PCT/CN2014/075666 Jul. 21, 2014.

* cited by examiner

*Primary Examiner* — Brian Shaw
(74) *Attorney, Agent, or Firm* — Anova Law Group, PLLC

(57) ABSTRACT

Methods and systems for centralizedly controlling server user rights are provided herein. In an exemplary method, a first verification server can receive an instruction sent by a control server. The instruction can include a user-right-processing instruction or a user-right-adding instruction. The first verification server can process stored information of user rights in response to the user-right-processing instruction sent by the control server to generate processed information of the user rights, or the first verification server can store newly added information of the user rights in response to the user-right-adding instruction sent by the (Continued)

control server. The first verification server can then synchronize the processed information of the user rights or the newly added information of the user rights with a second verification server. The second verification server can be in a communication connection with the first verification server.

17 Claims, 6 Drawing Sheets

(51) Int. Cl.
*H04L 29/06* (2006.01)
*G06F 21/60* (2013.01)

SYSTEM AND METHOD FOR CENTRALIZEDLY CONTROLLING SERVER USER RIGHTS

CROSS-REFERENCES TO RELATED APPLICATIONS

This application is a continuation application of PCT Patent Application No. PCT/CN2014/075666, filed on Apr. 18, 2014, which claims priority to Chinese Patent Application No. 201310226082.7, filed on Jun. 7, 2013, the entire contents of which are incorporated herein by reference.

FIELD OF THE DISCLOSURE

The present disclosure generally relates to user rights control technology and, more particularly, relates to systems and methods for centralizedly controlling server user rights.

BACKGROUND

Windows Active Directory (Windows AD) is a centralized directory management service (or directory service) for architecture of large and medium network environment on a Microsoft Windows Server. From Windows 2000 Server products, Windows Server products start to have built-in Windows AD. Windows AD is configured to process network objects in an organization. Objects can be users, groups, computers, domain controllers, mails, configurations, organizational units, trees, etc. An object that is defined in an Active Directory (AD) schema can be stored in an AD database and accessed via an AD Service Interface. Many AD management tools use the AD Service Interface to retrieve and use AD data.

AD is also used as a data structure for connecting certain Microsoft server software to network domains. For example, Microsoft Exchange Server 2003-2007 all use AD to store personal mailbox data (by creating a new AD Schema), and list AD as a necessary condition for building an Exchange Server.

Windows AD's core function is to manage resources in a large network, including various user resources. However, Windows AD supports Windows platform, does not support other mainstream operating platforms (e.g., Linux platform), and applies only to office network having a small number of servers. In addition, configuration of user rights is complicated. Meanwhile, information of user rights managed by Windows AD is stored in business servers, so the stored information of the user rights needs to be handled individually without precise and centralized control. Further, it is difficult to control a situation in which one user account logs in all business servers within the system architecture. Thus, security of the business servers cannot be guaranteed.

BRIEF SUMMARY OF THE DISCLOSURE

One aspect of the present disclosure includes a method for centralizedly controlling server user rights. In an exemplary method, a first verification server can receive an instruction sent by a control server. The instruction can include a user-right-processing instruction or a user-right-adding instruction. The first verification server can process stored information of user rights in response to the user-right-processing instruction sent by the control server to generate processed information of the user rights, or the first verification server can store newly added information of the user rights in response to the user-right-adding instruction sent by the control server. The first verification server can then synchronize the processed information of the user rights or the newly added information of the user rights with a second verification server. The second verification server can be in a communication connection with the first verification server.

Another aspect of the present disclosure includes a system for centralizedly controlling server user rights. The system can include a plurality of business servers, at least one control server, and a plurality of verification servers. Each verification server of the plurality of verification servers can be in a communication connection with multiple business servers of the plurality of business servers. The at least one control server can correspond to and can be in a communication connection with at least one verification server of the plurality of verification servers. The at least one control server can be configured to send an instruction to a corresponding verification server. The instruction can include a user-right-processing instruction or a user-right-adding instruction. The corresponding verification server can be configured to store information of user rights. The corresponding verification server can be configured to process the stored information of the user rights in response to the user-right-processing instruction to generate processed information of the user rights, or store newly added information of the user rights in response to the user-right-adding instruction. The corresponding verification server can further be configured to synchronize the processed information of the user rights or the newly added information of the user rights with another verification server, wherein the another verification server is in a communication connection with the corresponding verification server.

Another aspect of the present disclosure includes a method for centralizedly controlling server user rights. An exemplary method can be implemented by a control server. First binding data between an IP address of a business server and a business module, and second binding data between a user account and the business module, can be regularly obtained from a configuration server. Mapping data between the user account and the IP address of the business server can be generated, according to the first binding data between the IP address of the business server and the business module and the second binding data between the user account and the business module. The mapping data between the user account and the IP address of the business server can be sent to a corresponding verification server to store and to synchronize with another verification server in a communication connection with the corresponding verification server.

Another aspect of the present disclosure includes a method for centralizedly controlling server user rights. An exemplary method can be implemented by a control server. First binding data between an IP address of a business server and a business module can be regularly obtained from a configuration server. The control server can store second binding data between a user account and the business module. Mapping data between the user account and the IP address of the business server can be generated, according to the first binding data between the IP address of the business server and the business module and the second binding data between the user account and the business module. The mapping data between the user account and the IP address of the business server can be sent to a corresponding verification server to store and to synchronize with another verification server in a communication connection with the corresponding verification server.

Another aspect of the present disclosure includes a method for centralizedly controlling server user rights. An exemplary method can be implemented by a verification server. A user-right-verification request sent by a business server can be received. In response to the user-right-verification request, rights of a login user can be verified, according to stored information of user rights. Verification feedback information can be sent to the business server for the business server to accept or deny login of the login user.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

A server, as used herein, may refer to one or more server computers configured to provide certain server functionalities, e.g., storing and processing information of user rights, running business programs, sending/receiving instructions between servers, and/or receiving user login request/information. A server may also include one or more processors to execute computer programs in parallel. A server may be coupled with a terminal through a communication network for information exchange, including, e.g., sending/receiving user login request/information.

Figure 10:
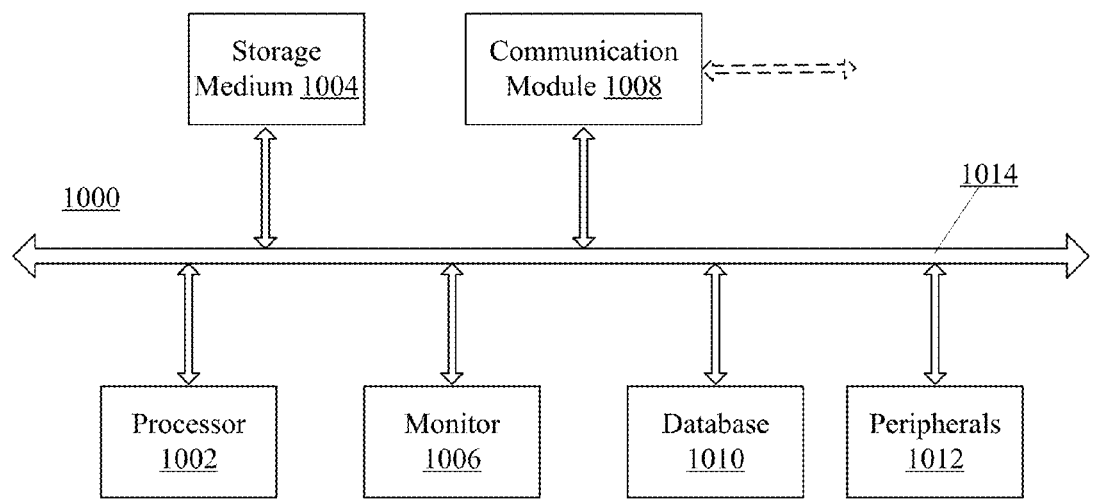
FIG. 10 depicts an exemplary computing system consistent with the disclosed embodiments.

The server may be implemented on any appropriate computing platform. FIG. 10 shows a block diagram of an exemplary computing system 1000 (or computer system 1000) capable of implementing the server. As shown in FIG. 10, the exemplary computer system 1000 may include a processor 1002, a storage medium 1004, a monitor 1006, a communication module 1008, a database 1010, peripherals 1012, and one or more bus 1014 to couple the devices together. Certain devices may be omitted and other devices may be included.

The processor 1002 can include any appropriate processor or processors. Further, the processor 1002 can include multiple cores for multi-thread or parallel processing. The storage medium 1004 may include memory modules, e.g., Read-Only Memory (ROM), Random Access Memory (RAM), and flash memory modules, and mass storages, e.g., CD-ROM, U-disk, removable hard disk, etc. The storage medium 1004 may store computer programs for implementing various processes (e.g., processing/adding information of user rights, verifying user login information, etc.), when executed by the processor 1002.

The monitor 1006 may include display devices for displaying contents in the computing system 1000, e.g., displaying a centralizedly-controlling interface, and/or any sub-interfaces thereof. The peripherals 1012 may include I/O devices such as keyboard and mouse.

Further, the communication module 1008 may include network devices for establishing connections through the communication network. The database 1010 may include one or more databases for storing certain data and for performing certain operations on the stored data, e.g., storing information of user rights, storing binding/mapping data, etc.

In operation, a server may be configured to provide structures and functions for various actions and operations. More particularly, the server may include a control server, a verification server, a business server, or any other appropriate servers to accomplish corresponding functions.

Various embodiments provide systems and methods for centralizedly controlling server user rights. The methods and systems disclosed in accordance with various embodiments can be executed by a system including one or more servers (i.e., accordingly one or more computer systems). As used herein, unless otherwise specified, "server user rights" can refer to any user rights that are managed, stored, and/or controlled by a server.

As used herein, unless otherwise specified, an LDAP (Lightweight Directory Access Protocol) Server can refer to a server that provides LDAP service. A business Server can refer to a non-LDAP server configured to run business programs. NSS (Name Service Switch) can refer to a name interpretation service in Linux/Unix operating systems. PAM (Pluggable Verification Module) can refer to a security verification mechanism used by a Linux/Unix operating system as an intermediate layer between a user and an application program. CMDB (configuration management database) can refer to a system that manages mapping between equipment and business modules. A CMDB Server can refer to a server configured to implement a CMDB system. IDC (Internet data center) can refer to a business server group center configured as a facility center for housing business servers and related components.

Figure 1:
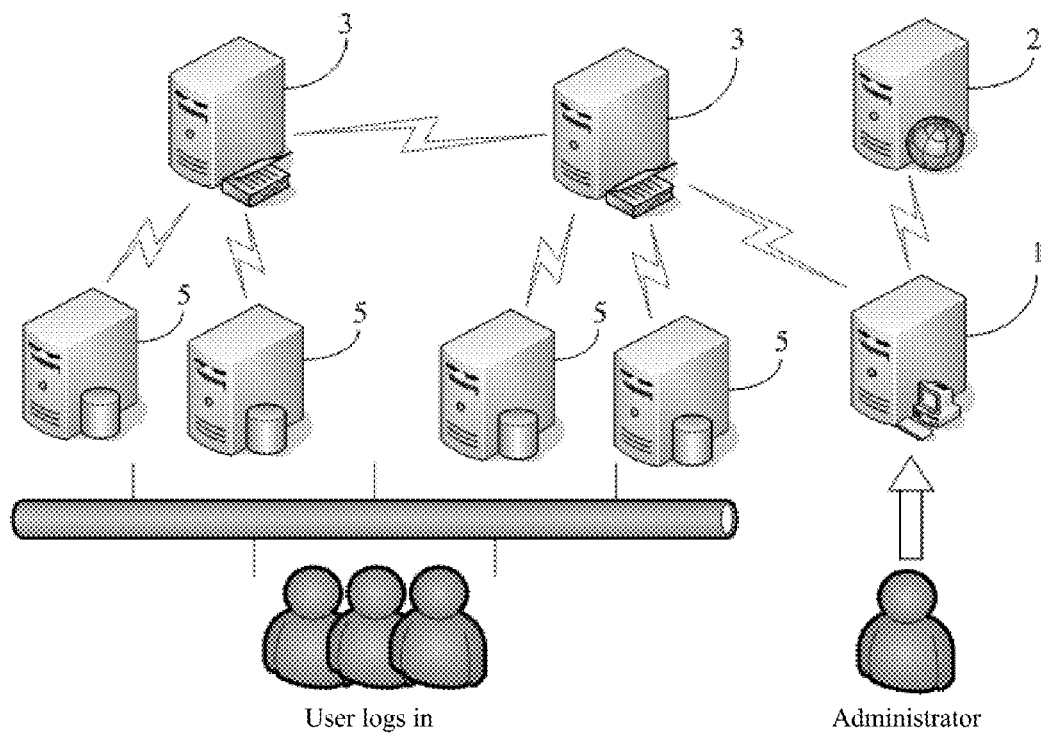
FIG. 1 depicts a system architecture structure diagram of an exemplary system for centralizedly controlling server user rights in accordance with various disclosed embodiments.

FIG. 1 depicts a system architecture structure diagram of an exemplary system for centralizedly controlling server user rights in accordance with various disclosed embodiments. As shown in FIG. 1, the exemplary system for centralizedly controlling server user rights can be used for centralized control of user rights. The system can include a plurality of business servers 5, at least one control server 1 (for illustrative purposes, one control server 1 is depicted in FIG. 1), and a plurality of verification servers 3. Each verification server 3 can correspond to multiple business servers 5, and can be in a communication connection with various corresponding business servers 5. The control server 1 can correspond to at least one verification server 3 and can be in a communication connection with the corresponding verification server 3. As used herein, unless otherwise specified, being 'in a communication connection' can refer to being 'connected in any suitable configuration in order to accomplish communication'.

Further, in order to prevent a situation in which one account logs in all business servers 5 within the system architecture during the centralized control of user rights and thus to improve login security, and to achieve precise control of mapping between a user and a business server 5 and thus prevent confusion about rights to log in the business server 5 among users, the system for centralizedly controlling server user rights can further include at least one configuration server 2. For illustrative purposes, one configuration server 2 is depicted in FIG. 1. In certain embodiments, the configuration server 2 can include a CMDB server. The configuration server 2 can be in a communication connection with the control server 1. The configuration server 2 (e.g., the CMDB server) can be configured to set and store binding data between Internet Protocol (IP) addresses of the business servers 5 and business modules (i.e., first binding data), and/or binding data between user accounts and the business modules (i.e., second binding data). The binding data can also be referred to as mapping data. The business module can refer to a software program system including, e.g., an instant messaging software system, a browser system, a gaming platform system, a payment system, etc. As used herein, unless otherwise specified, 'binding data between' can refer to 'any suitable data related to the binding between', and 'mapping data between' can refer to 'any suitable data related to the mapping between'.

The verification server can refer to any applicable server that can accomplish user rights verification. In certain embodiments, the verification server can include an LDAP server. For example, a business server 5 that runs a Linux/Unix operating system can use customized NSS ldap & PAM ldap to form a communication connection with a corresponding LDAP server 3 in order to verify user rights (or rights of users). The 'users' can refer to personnel that maintain a certain business server 5 (e.g., an administrator).

Figure 2:
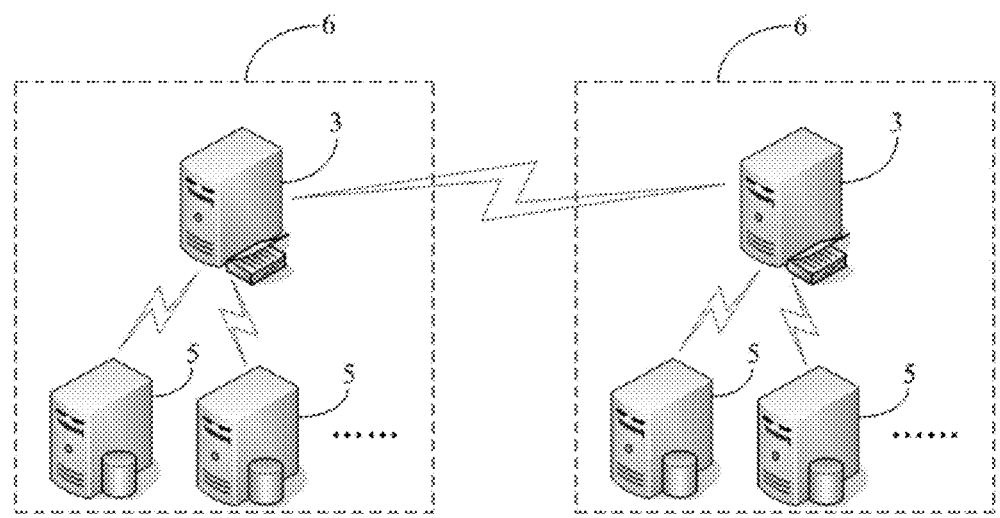
FIG. 2 depicts a structure diagram of localizing an LDAP server in a server group center in accordance with various disclosed embodiments.

Further, in one embodiment, in order to prevent a business server 5 from needing to cross-regionally connect to a corresponding verification server 3 (e.g., an LDAP server) to verify user rights when the user logs in the business server 5, one or more local LDAP servers 3 can be set for a group center of the business servers 5. For example, there can be one or more group centers in a region. In various embodiments, a region can refer to a geographic region. In certain embodiments, the group center can include, e.g., an IDC center 6 as shown in FIG. 2. A local LDAP server 3 corresponding to an IDC center 6 can be in a communication connection and have data synchronization with LDAP servers 3 in other regions. For example, a local LDAP server 3 corresponding to an IDC center 6 as shown in FIG. 2 can be in communication connection and have data synchronization with a local LDAP server 3 corresponding to another IDC center 6. When a user logs in each business server 5 of an IDC center 6 (i.e., each business server 5 that an IDC center 6 belongs to), the business server 5 to be logged in can optionally connect to a local LDAP server 3 corresponding to the IDC center 6 for user rights verification. Such an optional method can effectively enhance performance of user rights verification and reduce cross-regional network traffic.

Various components of the system for centralizedly controlling server user rights can have certain functions in the system architecture, respectively. The functions can be further detailed in the following embodiments.

Figure 5:
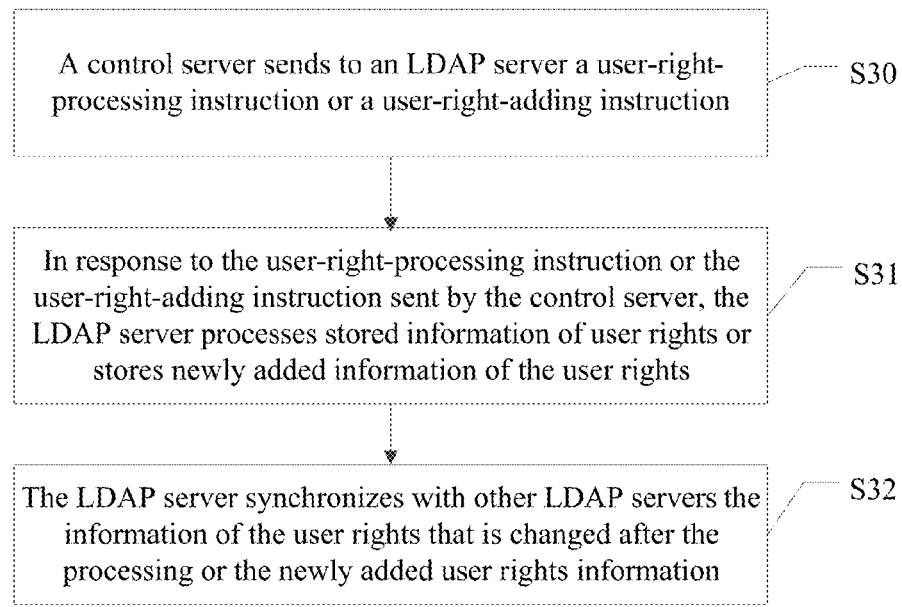
FIG. 5 depicts a flow diagram of an exemplary method for centralizedly controlling server user rights on an LDAP server using a control server in accordance with various disclosed embodiments.

FIG. 5 depicts a flow diagram of an exemplary method for centralizedly controlling server user rights on an LDAP server using a control server in accordance with various disclosed embodiments. As shown in FIG. 5, in Step S30, a control server 1 sends to a corresponding LDAP server 3 a user-right-processing instruction or a user-right-adding instruction.

In Step S31, the LDAP server 3 processes (e.g., changes) stored information of user rights in response to the user-right-processing instruction sent by the control server 1. In certain examples, the LDAP server 3 can accordingly generate processed information of user rights in response to the user-right-processing instruction. Alternatively, the LDAP server 3 stores new information of user rights in response to the user-right-adding instruction sent by the control server 1. In Step S32, the LDAP server 3 then synchronizes to other LDAP servers 3 the new (i.e., newly-added) information of user rights or the information of user rights that is changed after the processing.

The information of user rights can include any applicable information indicating legitimacy (i.e., validity) of identity used by a user to log in a business server 5, including, e.g., account information (e.g., account number), password, etc. In order to prevent a situation in which one account logs in all business servers 5 within the system architecture and thus to improve login security, in one embodiment, the information of user rights can further include mapping data of the user account information and the IP address of the business server 5. In various embodiments, the information of user rights can include the stored information of user rights, the new information of user rights, and the processed information of user rights.

The user-right-processing instruction can include, e.g., a user-right-information-inquiry instruction, a user-right-information-deletion instruction, a user-right-information-modification instruction, and/or any other applicable user-right-processing instructions. A user-right-adding instruction can include, e.g., a temporary-user-right-information-adding instruction and/or any other applicable user-right-adding instructions. In some cases, the responding of the LDAP server 3 to the user-right-information-inquiry instruction does not cause the information of user rights to change. Therefore, after the LDAP server 3 responds to the user-right-information-inquiry instruction, the LDAP server 3 does not need to synchronize data with the other LDAP servers 3.

Figure 8:
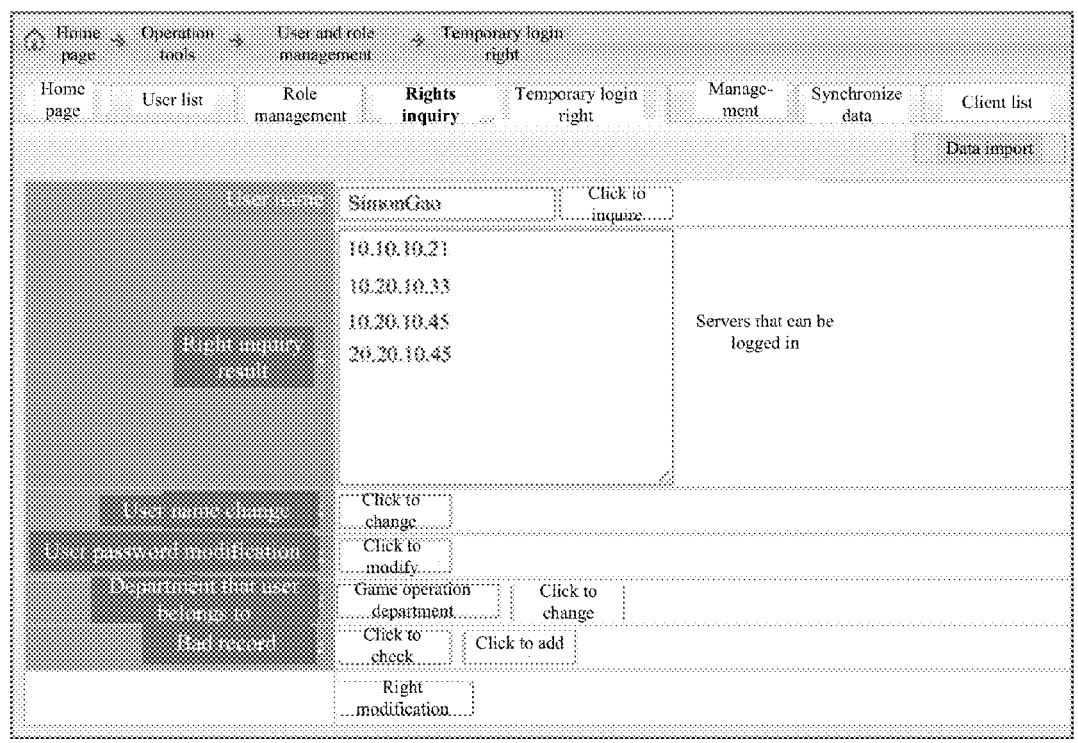
FIG. 8 depicts an exemplary right-inquiry-operation sub-interface of a centralizedly-controlling interface provided by a control server in accordance with various disclosed embodiments.
Figure 9:
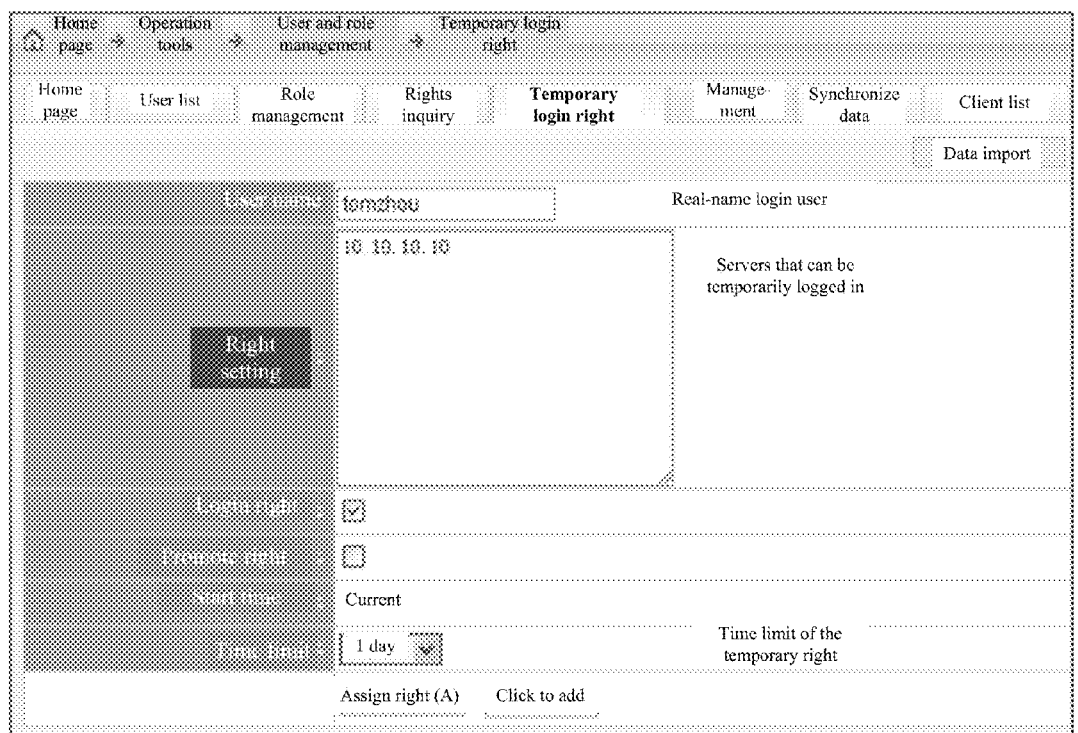
FIG. 9 depicts an exemplary temporary-login-right-operation sub-interface of a centralizedly-controlling interface provided by a control server in accordance with various disclosed embodiments.

The control server 1 can send to the corresponding LDAP server 3 the user-right-processing instruction or the user-right-adding instruction by the following methods. For example, the control server 1 can provide and display a centralizedly-controlling interface (e.g., as shown in FIGS. 8-9) for human-computer-interactive operation on the information of user rights. In various embodiments, the centralizedly-controlling interface can include a web interface. The control server 1 can detect and receive the various user-right-processing instructions or the various user-right-adding instructions sent by an operator of the control server 1 based on the centralizedly-controlling interface. The control server 1 can send to the corresponding LDAP server 3 the user-right-processing instructions or the user-right-adding instructions.

For example, FIG. 8 depicts an exemplary right-inquiry-operation sub-interface of a centralizedly-controlling interface provided by a control server in accordance with various disclosed embodiments. After the user clicks on a "rights inquiry" function button on the centralizedly-controlling interface provided by the control server 1, the user can enter the right-inquiry-operation sub-interface of the centralizedly-controlling interface. The right-inquiry-operation sub-interface can include, e.g., a user-name-input box and a corresponding inquiry button, a right-inquiry-result display box, a user-name-change button, a user-password-modification button, a right-modification button, a data-import button, etc.

For example, after the operator enters in the user-name-input box a user name to be inquired (for example, "SimonGao"), the operator can click on the inquiry button "click to inquire" corresponding to the user-name-input box, which can be equivalent to sending, to the LDAP server 3 corresponding to the centralizedly-controlling interface, a user-right-information-inquiry instruction corresponding to the inputted user name "SimonGao". The LDAP server 3 can respond to the user-right-information-inquiry instruction corresponding to the inputted user name "SimonGao", in order to obtain a stored IP address of a server (or stored IP addresses of servers) that can be logged in corresponding to the user name "SimonGao". The LDAP server 3 can then feedback the IP addresses to the right-inquiry-result display box on the centralizedly-controlling interface in order to be displayed (e.g., "10.10.10.21", "10.20.10.33", "10.20.10.45", "20.20.10.45" as shown in FIG. 8). The data-import button can be configured to import a small amount of information of user rights (e.g., import a maximum of 10 pieces of information of user rights at a time) to the LDAP server 3, and/or bulk import information of user rights (e.g., bulk import information of user rights from files of preset formats) to the LDAP server 3.

FIG. 9 depicts an exemplary temporary-login-right-operation sub-interface of a centralizedly-controlling interface provided by a control server in accordance with various disclosed embodiments. After the user clicks on a "temporary login rights" function button on the centralizedly-controlling interface provided by the control server 1, the user can enter the temporary-login-right-operation sub-interface of the centralizedly-controlling interface. The temporary-login-right-operation sub-interface can include, e.g., a user-name-input box, a temporary-right-setting box "rights setting", a right-assignment button "assign rights", a temporary-right-adding button "click to add", a time-limit-setting box "time limit", a data-import button, etc.

For example, the operator can enter in the user-name-input box a user name (for example, "tomzhou") for which temporary login rights is to be set, and can set in the temporary-right-setting box (e.g., box "rights setting") the IP address(es) of server(s) that can be logged in (e.g., "10.10.10.10"). The operator can then set in the time-limit-setting box "time limit" a time length limit for the temporary login rights (e.g., one day). Next, the operator can click on the temporary-right-adding button "click to add", which can be equivalent to sending, to the LDAP server 3 corresponding to the centralizedly-controlling interface, the inputted user name "tomzhou" and a corresponding user-right-adding instruction (e.g., a temporary-user-right-information-adding instruction). The LDAP server 3 can respond to the user name "tomzhou" and the corresponding temporary-user-right-information-adding instruction, in order to store temporary information of user rights of the new user name "tomzhou" and synchronize the temporary information of user rights of the new user name "tomzhou" to the other LDAP servers 3. The data-import button can be configured to import a small amount of information of user rights (e.g., import a maximum of 10 pieces of information of user rights at a time) to the LDAP server 3, and/or bulk import information of user rights (e.g., bulk import information of user rights from files of preset formats) to the LDAP server 3.

Figure 6:
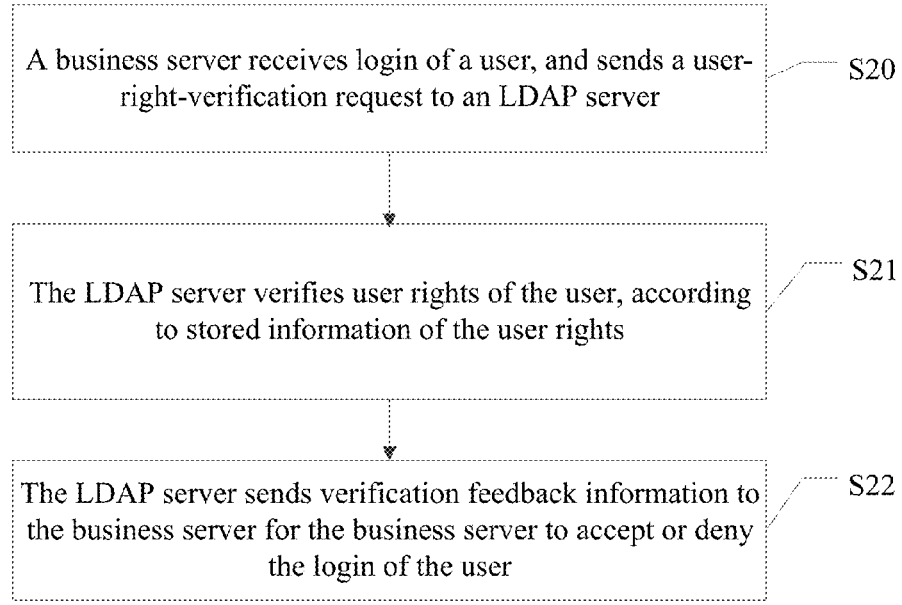
FIG. 6 depicts a flow diagram of an exemplary method for verifying user login information on a business server using an LDAP server in accordance with various disclosed embodiments.

FIG. 6 depicts a flow diagram of an exemplary method for verifying user login information on a business server using an LDAP server in accordance with various disclosed embodiments. As shown in FIG. 6, in Step S20, a business server 5 receives a user's login, and sends a user-right-verification request to a corresponding LDAP server. In various embodiments, a user's login can include the user's request to log in, the user's login information, etc. The user's login information can include any information that the user inputs in order to log in. In certain examples, a login user can refer to a user that requests to log in.

In Step S21, the LDAP server 3 responds to the user-right-verification request sent from the business server 5, and verifies rights of the user to log in according to information of user rights, e.g., the stored information of user rights. In Step S22, the LDAP server 3 then sends verification feedback information to the business server 5 that sends the user-right-verification request, such that the business server 5 that sends the user-right-verification request can accept or deny login of the user.

The user-right-verification request can include user information that needs to be verified, including, e.g., user account (e.g., account number), password, etc. of the user that currently requests to log in. When user accounts stored by the LDAP server 3 does not include the user account of the user that currently requests to log in, or when the password of the user that currently requests to log in is not consistent with a password stored by the LDAP server 3 corresponding to the user account of the user that currently requests to log in, the LDAP server 3 can send the verification feedback information to the business server 5 that sends the user-right-verification request. Thus, the business server 5 that sends the user-right-verification request can deny the login of the user.

When the user accounts stored by the LDAP server 3 include the user account of the user that currently requests to log in, and when the password of the user that currently requests to log in is consistent with a password stored by the LDAP server 3 corresponding to the user account of the user that currently requests to log in, the LDAP server 3 can send the verification feedback information to the business server 5 that sends the user-right-verification request. Thus, the business server 5 that sends the user-right-verification request can accept the login of the user.

Further, in order to prevent a situation in which one account logs in all business servers 5 within the system architecture and thus to improve login security, in one embodiment, the user-right-verification request can further include an IP address of the business server 5 that sends the user-right-verification request. According to mapping data of the stored user accounts and the IP address(es) of the business server(s) 5, the LDAP server 3 can verify whether the IP address of the business server 5 that sends the user-right-verification request is included in the IP address (es) of the business server(s) 5 that the user (i.e., the user that currently requests to log in) maps to.

For example, when the IP address of the business server 5 that sends the user-right-verification request is not included in the IP address(es) of the business server(s) 5 that the user (i.e., the user that currently requests to log in) maps to, the LDAP server 3 can send the verification feedback information to the business server 5 that sends the user-right-verification request. Thus, the business server 5 that sends the user-right-verification request can deny the login of the user.

For example, when the user accounts stored by the LDAP server 3 include the user account of the user that currently requests to log in, the password of the user that currently requests to log in is consistent with a password stored by the LDAP server 3 corresponding to the user account of the user that currently requests to log in, and the IP address of the business server 5 that sends the user-right-verification request is included in the IP address(es) of the business server(s) 5 that the user (i.e., the user that currently requests to log in) maps to the LDAP server 3 can send the verification feedback information to the business server 5 that sends the user-right-verification request. Thus, the business server 5 that sends the user-right-verification request can accept the login of the user.

Figure 7:
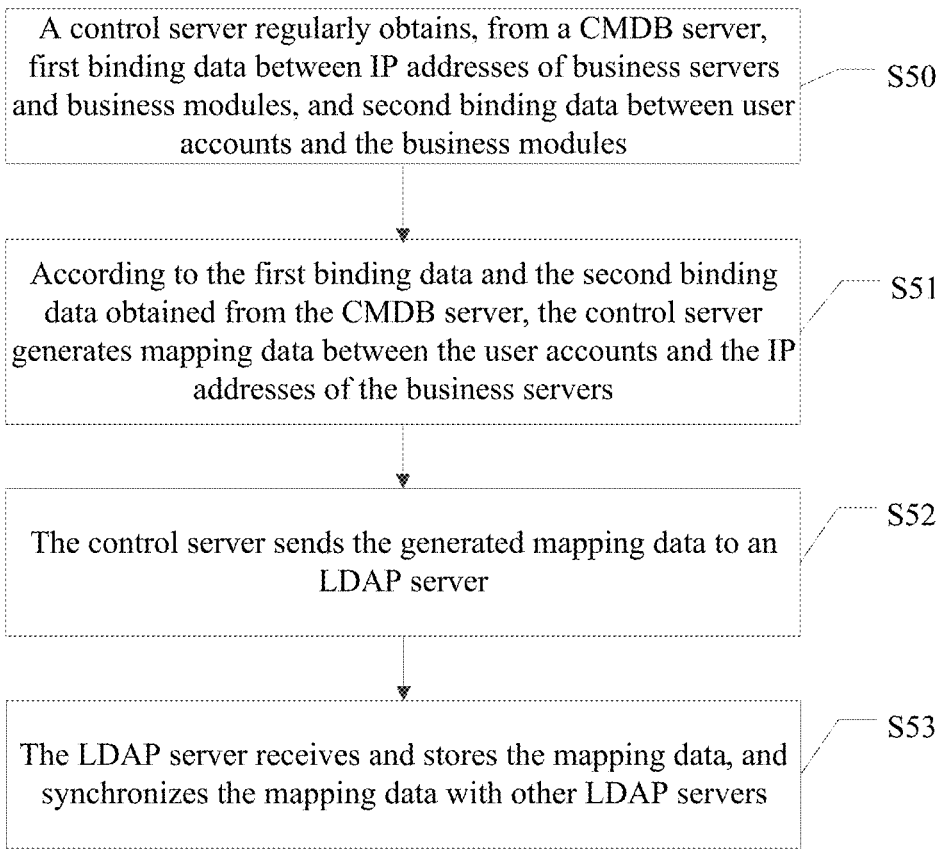
FIG. 7 depicts a flow diagram of an exemplary method for generating mapping data between a user account and an IP address of a business server using a control server and a CMDB server, in accordance with various disclosed embodiments.

FIG. 7 depicts a flow diagram of an exemplary method for generating mapping data between a user account and an IP address of a business server using a control server and a CMDB server, in accordance with various disclosed embodiments. In one embodiment, a CMDB server 2 can store binding data between IP addresses of business servers 5 and business modules (i.e., first binding data). For example, an IP address of a business server 5 can be "10.10.10.21", and a business module that the business server 5 runs can be "instant messaging software system". In this case, binding data between the IP address "10.10.10.21" and "instant messaging software system" can be stored in the CMDB server 2. Further, the CMDB server 2 can store binding data between user accounts and the business modules (i.e., second binding data). For example, a user account can be "SimonGao", and the user account can belong to registered account names of a business module "gaming platform system". In this case, binding data between the user account "SimonGao" and "gaming platform system" can be stored in the CMDB server 2.

In this case, as shown in FIG. 7, in Step S50, from the CMDB server 2, the control server 1 regularly (i.e., at a regular time interval, or at any suitable scheduled time) obtains the binding data between the IP addresses of the business servers 5 and the business modules (i.e., first binding data), and/or the binding data between the user accounts and the business modules (i.e., second binding data). In Step S51, according to the obtained first binding data between the IP addresses of the business servers 5 and the business modules, and/or the obtained second binding data between the user accounts and the business modules, the control server 1 generates mapping data between the user accounts and the IP addresses of the business servers 5.

In Step S52, the control server 1 then sends the generated mapping data between the user accounts and the IP addresses of the business servers 5 to a corresponding LDAP server 3. In Step S53, The LDAP server receives and stores the mapping data sent from the control server 1, and synchronizes the mapping data to other LDAP servers 3.

In another embodiment, a CMDB server 2 can store first binding data between IP addresses of business servers 5 and business modules. The control server 1 can store second binding data between user accounts and the business modules. From the CMDB server 2, the control server 1 can regularly (i.e., at a regular time interval) obtain the first binding data between the IP addresses of the business servers 5 and the business modules. According to the second binding data between the user accounts and the business modules (e.g., stored on the control server 1), and according to the obtained first binding data between the IP addresses of the business servers 5 and the business modules, the control server 1 can generate mapping data between the user accounts and the IP addresses of the business servers 5. The control server 1 can then send the generated mapping data between the user accounts and the IP addresses of the business servers 5 to a corresponding LDAP server 3. The LDAP server can receive and store the mapping data sent from the control server 1, and can synchronize the mapping data to other LDAP servers 3.

Further, optionally, during the control server 1 regularly obtaining from the CMDB server 2 the first binding data between the IP addresses of the business servers 5 and the business modules and/or the second binding data between the user accounts and the business modules, the following steps can be included. For example, the CMDB server 2 can analyze, in real time or at a scheduled time (e.g., at a regular time interval or at any other suitable scheduled time), whether the stored first binding data between the IP addresses of the business servers 5 and the business module, and/or the stored second binding data between the user accounts and the business modules, have changed. When the stored first binding data between the IP addresses of the business servers 5 and the business modules, and/or the stored second binding data between the user accounts and the business modules, have changed, the CMDB server 2 can send a data-receiving request to the control server 1. The control server 1 can respond to the data-receiving request sent by the CMDB server 2, and can thus receive, from the CMDB server 2, the first binding data between the IP addresses of the business servers 5 and the business modules and/or the second binding data between the user accounts and the business modules.

Figure 3:
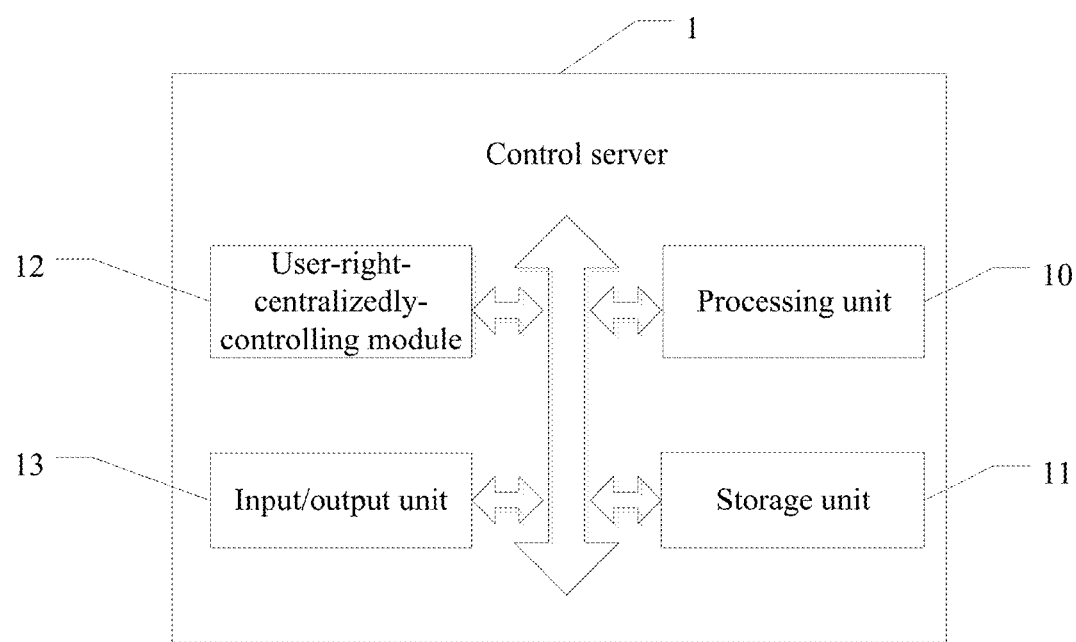
FIG. 3 depicts a structure diagram of an exemplary control server in accordance with various disclosed embodiments.

FIG. 3 depicts a hardware structure diagram of an exemplary control server in accordance with various disclosed embodiments. As shown in FIG. 3, the exemplary control server 1 can include at least one processing unit 10 (For illustrative purposes, one processing unit 10 is shown in FIG. 3), a storage unit 11, an input/output unit 13, and/or a user-right-centralizedly-controlling module 12. Some units may be omitted and other units may be included. For example, details of the exemplary control server 1 are further described in FIG. 10.

The user-right-centralizedly-controlling module 12 is configured to provide a centralizedly-controlling interface (e.g., as shown in FIGS. 8-9) for human-computer-interactive operation on information of user rights, for a user to input instructions. In various embodiments, the user-right-centralizedly-controlling module 12 can be implemented by the processor 1002 as depicted in FIG. 10.

The input/output unit 13 is configured to display the centralizedly-controlling interface provided by the user-right-centralizedly-controlling module 12, and to output and display response data for the instructions inputted by the user. The response data for the instructions inputted by the user can refer to data responding to the instructions inputted by the user. In various embodiments, the input/output unit 13 can include, e.g., the monitor 1006 and/or the peripherals 1012 as depicted in FIG. 10.

The storage unit 11 is configured to store program instructions corresponding to the user-right-centralizedly-controlling module 12 and operation data of the user-right-centralizedly-controlling module 12. The storage unit 11 can refer to any non-transitory computer-readable storage medium including, e.g., hard disk, U-disk, mobile hard disk drives, and/or any other suitable storage devices. In various embodiments, the storage unit 11 can include, e.g., the storage medium 1004 as depicted in FIG. 10.

The at least one processing unit 10 is configured to call and implement the user-right-centralizedly-controlling module 12, in order to accomplish centralized control of the information of user rights. In various embodiments, the processing unit 10 can include, e.g., the processor 1002 as depicted in FIG. 10.

Figure 4:
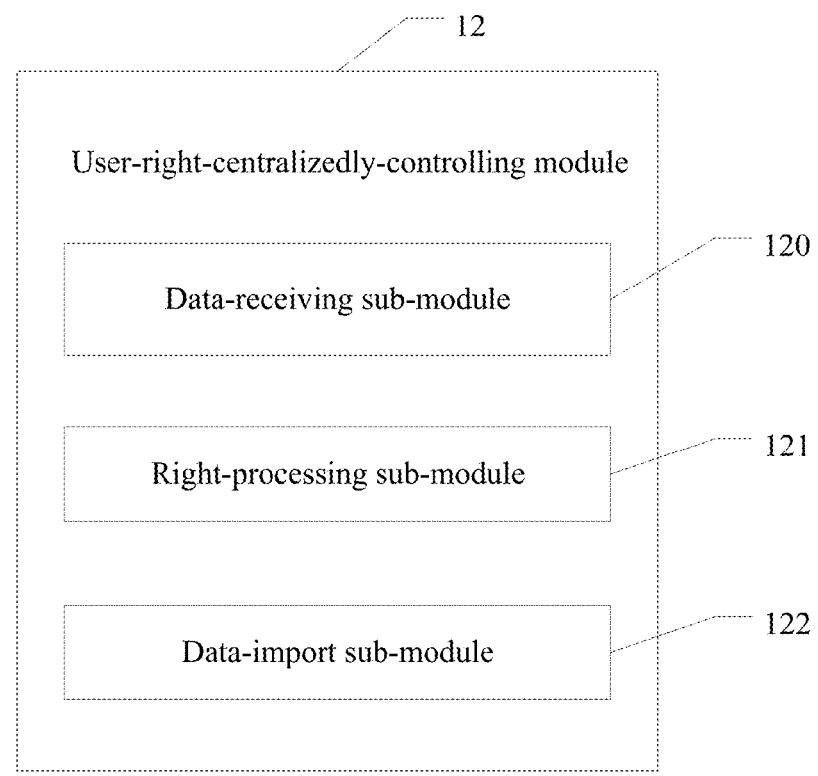
FIG. 4 depicts a hardware structure diagram of an exemplary user-right-centralizedly-controlling module in accordance with various disclosed embodiments.

FIG. 4 depicts a structure diagram of an exemplary user-right-centralizedly-controlling module in accordance with various disclosed embodiments. For example, the user-right-centralizedly-controlling module 12 shown in FIG. 4 can be the user-right-centralizedly-controlling module 12 as depicted in FIG. 3. The user-right-centralizedly-controlling module 12 can include a right-processing sub-module 121, and/or a data-import sub-module 122. Some sub-modules may be omitted and other sub-modules may be included.

The right-processing sub-module 121 is configured to send a user-right-processing instruction or a user-right-adding instruction to a corresponding LDAP server. The data-import sub-module 122 is configured to import a small amount of information of user rights (e.g., import a maximum of 10 pieces of information of user rights at a time) to the LDAP server 3, and/or bulk import information of user rights (e.g., bulk import information of user rights from files of preset formats) to the LDAP server 3.

Further, user-right-centralizedly-controlling module 12 can include a data-receiving sub-module 120. In one embodiment, the data-receiving sub-module 120 is configured to regularly (i.e., at a regular time interval) obtain, from the CMDB server 2, first binding data between IP addresses of business servers 5 and business modules, and/or second binding data between user accounts and the business modules. According to the obtained first binding data between the IP addresses of the business servers 5 and the business modules, and/or the obtained second binding data between the user accounts and the business modules, the data-receiving sub-module 120 can be configured to generate mapping data between the user accounts and the IP addresses of the business servers 5. The data-receiving sub-module 120 can be configured to send the generated mapping data between the user accounts and the IP addresses of the business servers 5 to a corresponding LDAP server 3.

In another embodiment, the control server 1 can store second binding data between user accounts and business modules. In this case, the data-receiving sub-module 120 is configured to regularly (i.e., at a regular time interval) obtain, from the CMDB server 2, the first binding data between the IP addresses of the business servers 5 and the business modules. The data-receiving sub-module 120 is configured to read (i.e., retrieve) the second binding data between user accounts and the business modules stored on the control server 1. According to the second binding data between the user accounts and the business modules (e.g., stored on the control server 1), and according to the obtained first binding data between the IP addresses of the business servers 5 and the business modules, the data-receiving sub-module 120 is configured to generate mapping data between the user accounts and the IP addresses of the business servers 5. The data-receiving sub-module 120 is configured to send the generated mapping data between the user accounts and the IP addresses of the business servers 5 to a corresponding LDAP server 3.

Further, the data-receiving sub-module 120 can obtain the first binding data between the IP addresses of the business servers 5 and the business modules and/or the second binding data between the user accounts and the business modules using the following methods. For example, the data-receiving sub-module 120 can respond to a data-receiving request sent by a CMDB server 2, and thus receive, from the CMDB server 2, the first binding data between the IP addresses of the business servers 5 and the business modules and/or the second binding data between the user accounts and the business modules.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of Internet applications. By using the disclosed methods and systems, centralized control of server user rights can be achieved. An exemplary system for centralizedly controlling server user rights can include a plurality of business servers, at least one control server, and a plurality of verification servers. Each verification server of the plurality of verification servers can be in a communication connection with multiple business servers of the plurality of business servers. The at least one control server can correspond to and can be in a communication connection with at least one verification server of the plurality of verification servers.

The at least one control server can be configured to send an instruction to a corresponding verification server. The corresponding verification server can be configured to store information of user rights. In response to the instruction, the corresponding verification server can be configured to process the stored information of the user rights to generate processed information of the user rights, or store newly added information of the user rights. The corresponding verification server can further be configured to synchronize the processed information of the user rights or the newly added information of the user rights with another verification server that is in a communication connection with the corresponding verification server.

In order to prevent a business server from needing to cross-regionally connect to a corresponding verification server to verify user rights when a user logs in the business server, one or more local verification servers can be set for a group center of the business servers. A local verification server corresponding to one group center can be in communication connection and have data synchronization with verification servers in other regions. When a user logs in a business server of a group center, the business server can optionally connect to a local verification server corresponding to the group center for user rights verification. Such a method can effectively enhance performance of user rights verification and reduce cross-regional network traffic.

Further, in order to prevent a situation in which a user of one account logs in all business servers within the system architecture during the centralized control of user rights and thus improve login safety, and to achieve precise control of mapping between a user and a business server and thus prevent confusion about rights to log in the business server among users, the system for centralizedly controlling server user rights can further include at least one configuration server. The configuration server can be in communication connection with the control server. The configuration server can be configured to set and store first binding data between Internet Protocol (IP) addresses of the business servers and business modules, and/or second binding data between user accounts and the business modules. Mapping data of the user account information and the IP address of the business server can be generated according to the first binding data and the second binding data.

The information of user rights can then include the mapping data of the user account information and the IP address of the business server. A business server can send, to a corresponding verification server, a user-right-verification request including an IP address of the business server. According to mapping data of the stored user accounts and the IP addresses of the business servers, the verification server can verify whether the IP address of the business server that sends the user-right-verification request is included in the IP addresses of the business servers that a login user maps to, such that rights of the login user can be verified. Such methods can prevent a situation in which the user of one account logs in all business servers within the system architecture. Login security can thus be improved.

What is claimed is:

1. A method for centralizedly controlling server user rights, comprising:
   receiving, by a first verification server, an instruction sent by a control server, wherein the instruction includes a user-right-processing instruction or a user-right-adding instruction;
   processing, by the first verification server, stored information of user rights in response to the user-right-processing instruction sent by the control server to generate processed information of the user rights, or
   storing, by the first verification server, newly added information of the user rights in response to the user-right-adding instruction sent by the control server;
   synchronizing, by the first verification server, the processed information of the user rights or the newly added information of the user rights with a second verification server, wherein the second verification server is in a communication connection with the first verification server;
   regularly obtaining from a configuration server, by the control server, first binding data between an IP address of a business server and a business module, wherein the control server stores second binding data between a user account and the business module;
   generating, by the control server, mapping data between the user account and the IP address of the business server, according to the first binding data between the IP address of the business server and the business module and the second binding data between the user account and the business module; and
   sending, by the control server, the mapping data between the user account and the IP address of the business server to a corresponding verification server to store and to synchronize with another verification server in a communication connection with the corresponding verification server.

2. The method according to claim 1, further including:
   receiving, by a verification server, a user-right-verification request sent by a business server;
   in response to the user-right-verification request, verifying, by the verification server, rights of a login user, according to the stored information of the user rights; and
   sending, by the verification server, verification feedback information to the business server for the business server to accept or deny login of the login user.

3. A system for centralizedly controlling server user rights, comprising:
   a plurality of business servers, at least one control server, and a plurality of verification servers, wherein each verification server of the plurality of verification servers is in a communication connection with multiple business servers of the plurality of business servers, and the at least one control server corresponds to and is in a communication connection with at least one verification server of the plurality of verification servers; and
   wherein:
   the at least one control server is configured to send an instruction to a corresponding verification server, wherein the instruction includes a user-right-processing instruction or a user-right-adding instruction;
   the corresponding verification server is configured to:
     store information of user rights;
     process the stored information of the user rights in response to the user-right-processing instruction to generate processed information of the user rights, or
     store newly added information of the user rights in response to the user-right-adding instruction; and
     synchronize the processed information of the user rights or the newly added information of the user rights with another verification server, wherein the another verification server is in a communication connection with the corresponding verification server;
   the system further includes at least one configuration server in a communication connection with the at least one control server, wherein:
     the at least one configuration server is configured to set and store first binding data between an IP address of one business server of the plurality of business servers and a business module; and
     the at least one control server is configured to set and store second binding data between a user account and the business module; and
   the control server is further configured to:
     regularly obtain from the at least one configuration server, the first binding data between the IP address of the one business server and the business module;
     generate mapping data between the user account and the IP address of the one business server, according to the first binding data between the IP address of the one business server and the business module and the second binding data between the user account and the business module; and
     send the mapping data between the user account and the IP address of the one business server to a corresponding verification server.

4. The system according to claim 3, wherein a verification server is further configured to verify validity of the user rights of a login user of a business server of the plurality of business servers, according to the stored information of the user rights, the newly added information of the user rights, and the processed information of the user rights.

5. The system according to claim 3, wherein:
the at least one configuration server is configured to:
analyze, in real time or at a scheduled time, whether the first binding data or the second binding data have changed; and
when the first binding data or the second binding data have changed, send a data-receiving request to the at least one control server; and
the at least one control server is configured to:
in response to the data-receiving request sent by the at least one configuration server, receive, from the at least one configuration server, the first binding data and the second binding data.

6. The system according to claim 3, wherein the at least one control server is further configured to:
regularly obtain from the at least one configuration server, the first binding data between the IP address of the one business server and the business module, and the second binding data between the user account and the business module;
generate mapping data between the user account and the IP address of the one business server, according to the first binding data between the IP address of the one business server and the business module and the second binding data between the user account and the business module; and
send the mapping data between the user account and the IP address of the one business server to a corresponding verification server.

7. The system according to claim 3, wherein:
the at least one configuration server is configured to:
analyze, in real time or at a scheduled time, whether the first binding data between the IP address of the one business server have changed; and
when the first binding data have changed, send a data-receiving request to the at least one control server; and
the at least one control server is configured to:
in response to the data-receiving request sent by the at least one configuration server, receive, from the at least one configuration server, the first binding data between the IP address of the one business server and the business module.

8. The system according to claim 3, wherein:
one business server of the plurality of business servers is configured to:
receive login of a current user; and
send a user-right-verification request to a corresponding verification server, when the current user logs in; and
the corresponding verification server is configured to:
in response to the user-right-verification request, verify the user rights according to the stored information of the user rights; and
send verification feedback information to the one business server for the one business server to accept or deny the login of the current user.

9. The system according to claim 8, wherein:
the information of the user rights includes a user account and a user password; and
the user-right-verification request includes the user account and the user password of the current user.

10. The system according to claim 9, wherein the corresponding verification server is configured:
when user accounts stored on the corresponding verification server do not include the user account of the current user, or
when the user password of the current user is not consistent with a password stored on the corresponding verification server that corresponds to the user account of the current user,
to send the verification feedback information to the one business server for the one business server to deny the login of the current user; and
when the user accounts stored on the corresponding verification server include the user account of the current user, and
when the user password of the current user is consistent with the password stored on the corresponding verification server that corresponds to the user account of the current user,
to send the verification feedback information to the one business server for the one business server to accept the login of the current user.

11. The system according to claim 8, wherein:
the information of the user rights includes mapping data between a user account and an IP address of a business server; and
the user-right-verification request includes an IP address of the one business server.

12. The system according to claim 11, wherein the corresponding verification server is configured to:
when an IP address of the business server mapped by a user account of the current user does not include the IP address of the one business server in the user-right-verification request,
send the verification feedback information to the one business server for the one business server to deny the login of the current user.

13. The system according to claim 3, wherein the at least one control server includes a user-right-centralizedly-controlling module, and the user-right-centralizedly-controlling module includes:
a right-processing sub-module configured to send a user-right-processing instruction or a user-right-adding instruction to a corresponding verification server.

14. The system according to claim 13, wherein the user-right-centralizedly-controlling module is configured to provide a centralizedly-controlling interface for a human-computer-interactive operation on the information of the user rights, for a user to input the user-right-processing instruction or the user-right-adding instruction.

15. The system according to claim 13, wherein the user-right-centralizedly-controlling module further includes:
a data-import sub-module configured to import the information of the user rights and to send the information of the user rights to the corresponding verification server.

16. The system according to claim 13, wherein the user-right-centralizedly-controlling module further includes:
a data-receiving sub-module configured to:
regularly obtain from a configuration server, first binding data between an IP address of one business server of the plurality of business servers and a business module, and second binding data between a user account and the business module;
generate mapping data between the user account and the IP address of the one business server, according to the first binding data between the IP address of the one business server and the business module and the second binding data between the user account and the business module; and send the mapping data between the user account and the IP address of the one business server to a verification server corresponding to the at least one control server.

17. The system according to claim 16, wherein the data-receiving sub-module is configured to obtain the first binding data between the IP address of the one business server and the business module, and the second binding data between the user account and the business module by:

in response to a data-receiving request sent by the configuration server, receiving, from the configuration server, the first binding data between the IP address of the one business server and the business module, and the second binding data between the user account and the business module.

* * * * *